(12) United States Patent
Capelot et al.

(10) Patent No.: US 10,961,362 B2
(45) Date of Patent: Mar. 30, 2021

(54) METHOD FOR PRODUCING A FIBRE-REINFORCED POLYAMIDE MATRIX COMPOSITE MATERIAL FROM A REACTIVE PREPOLYMER PRECURSOR COMPOSITION

(71) Applicant: ARKEMA FRANCE, Colombes (FR)

(72) Inventors: Mathieu Capelot, Bernay (FR); Gilles Hochstetter, L'Hay les Roses (FR)

(73) Assignee: Arkema France, Colombes (FR)

(*) Notice: Subject to any disclaimer, the term of this patent is extended or adjusted under 35 U.S.C. 154(b) by 270 days.

(21) Appl. No.: 15/778,080

(22) PCT Filed: Dec. 9, 2016

(86) PCT No.: PCT/FR2016/053294
§ 371 (c)(1),
(2) Date: May 22, 2018

(87) PCT Pub. No.: WO2017/098178
PCT Pub. Date: Jun. 15, 2017

(65) Prior Publication Data
US 2018/0346666 A1 Dec. 6, 2018

(30) Foreign Application Priority Data
Dec. 10, 2015 (FR) ...................... 1562134

(51) Int. Cl.
| | | |
|---|---|---|
| B29C 45/00 | (2006.01) | |
| B29L 31/30 | (2006.01) | |
| B29C 70/48 | (2006.01) | |
| B29K 77/00 | (2006.01) | |
| B29K 105/16 | (2006.01) | |
| B29K 507/04 | (2006.01) | |
| C08J 5/04 | (2006.01) | |
| C08L 77/06 | (2006.01) | |
| C08G 69/00 | (2006.01) | |
| C08G 69/28 | (2006.01) | |

(52) U.S. Cl.
CPC ........... *C08J 5/043* (2013.01); *B29C 45/0001* (2013.01); *C08G 69/00* (2013.01); *C08G 69/28* (2013.01); *C08J 5/04* (2013.01); *C08J 5/042* (2013.01); *C08J 5/044* (2013.01); *C08J 5/046* (2013.01); *C08L 77/06* (2013.01); *B29C 70/48* (2013.01); *B29K 2077/00* (2013.01); *B29K 2105/162* (2013.01); *B29K 2507/04* (2013.01); *B29L 2031/30* (2013.01); *C08J 2377/00* (2013.01); *C08J 2377/06* (2013.01)

(58) Field of Classification Search
CPC ... C08J 5/043; C08J 5/046; C08J 5/044; C08J 5/042; C08J 5/04; C08J 2377/00; C08J 2377/06; C08J 5/24; C08G 69/00; C08G 69/28; C08L 77/06; B29C 45/0001; B29C 70/48; B29C 70/54; B29K 2507/04; B29K 2105/162; B29K 2077/00; C08K 2201/011; C08K 3/04; C08K 3/042; C08K 3/041; C08K 3/046; B29L 2031/30
See application file for complete search history.

(56) References Cited

U.S. PATENT DOCUMENTS

| | | | |
|---|---|---|---|
| 4,927,583 A | 5/1990 | Lottiau et al. | |
| 5,422,418 A | 8/1995 | Maj et al. | |
| 5,482,998 A * | 1/1996 | Muehlbach | C08G 69/36 525/179 |
| 7,927,710 B2 * | 4/2011 | Hewel | C08G 69/265 428/474.4 |
| 9,139,707 B2 | 9/2015 | Hochstetter et al. | |
| 9,752,029 B2 * | 9/2017 | Briffaud | C08G 69/265 |
| 2011/0306718 A1 | 12/2011 | Seherzer et al. | |
| 2012/0095161 A1 | 4/2012 | Pawlik et al. | |
| 2014/0316063 A1 | 10/2014 | Hochsetter et al. | |
| 2015/0126646 A1 * | 5/2015 | Hochstetter | B29C 70/48 524/35 |
| 2015/0258742 A1 * | 9/2015 | Hochstetter | B29C 67/246 264/236 |
| 2016/0130397 A1 * | 5/2016 | Clauss | C08G 69/28 528/339 |
| 2017/0037199 A1 | 2/2017 | Hochsetter et al. | |

(Continued)

FOREIGN PATENT DOCUMENTS

| | | |
|---|---|---|
| EP | 0261020 A1 | 3/1988 |
| EP | 0550314 A1 | 7/1993 |
| EP | 1988113 A1 | 11/2008 |

(Continued)

OTHER PUBLICATIONS

International Search Report and Written Opinion for International Application No. PCT/FR2016/053294, dated Mar. 23, 2017, 8 pages.

*Primary Examiner* — William P Fletcher, III
(74) *Attorney, Agent, or Firm* — Thomas F. Roland

(57) ABSTRACT

A process and reactive prepolymer composition for producing a part made of a thermoplastic composite material by molding in a closed mold, where the material includes reinforcing fibers and a polyamide thermoplastic matrix impregnating the fibers having the steps of preparing the reactive prepolymer precursor, injecting the reactive prepolymer precursor in the molten state into the closed mold containing the fibers, thereby impregnating the fibers with the reactive precursor mixture, bulk polymerizing the reactive prepolymer precursor in situ, and demolding the molded part produced.

18 Claims, 1 Drawing Sheet

(56) References Cited

U.S. PATENT DOCUMENTS

2017/0037204 A1* 2/2017 Briffaud .................. B29C 70/48

FOREIGN PATENT DOCUMENTS

| FR | 3019827 A1 | 10/2015 |
|----|------------|---------|
| WO | 2011003973 A2 | 1/2011 |
| WO | 2013060976 A1 | 5/2013 |
| WO | 2013178955 A1 | 12/2013 |
| WO | 2014064375 A1 | 5/2014 |

* cited by examiner

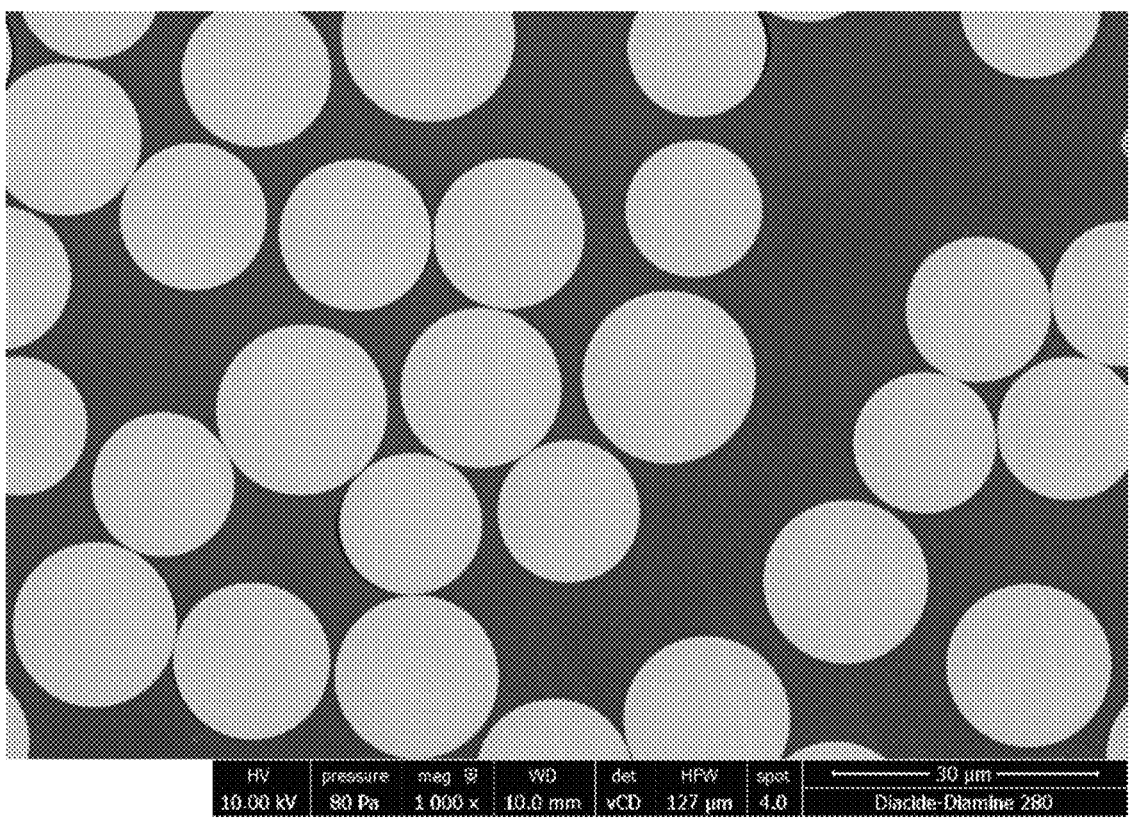

METHOD FOR PRODUCING A FIBRE-REINFORCED POLYAMIDE MATRIX COMPOSITE MATERIAL FROM A REACTIVE PREPOLYMER PRECURSOR COMPOSITION

CROSS-REFERENCE TO RELATED APPLICATIONS

This is the national phase of International Application No. PCT/FR2016/053294, filed on 9 Dec. 2016, which claims priority to French Application No. 15-62134, filed 10 Dec. 2015. The disclosure of each of these applications is incorporated herein by reference in its entirety for all purposes.

FIELD OF THE INVENTION

The present invention relates to a process for producing a part made of a composite material that is reinforced with fibers (also referred to as having "fibrous reinforcement" hereinafter) in a closed mold, preferably by the resin transfer molding (RTM), in particular c-RTM (compression RTM), technique or by the RIM (reaction injection molding), in particular S-RIM (structural RIM), technique, more preferentially by c-RTM, using a specific reactive composition based on prepolymer, said reactive composition being a precursor of the final polymer of the thermoplastic matrix which is a semicrystalline polyamide having a high glass transition temperature (Tg) of greater than 80° C. and a high melting point of less than 280° C., with an ease of impregnation of the fibrous substrate and an ease of processing of said composite material at controlled temperatures, with no risk of thermal degradation of said thermoplastic matrix polymer. The composite material products derived from this process are used in mechanical applications of the type of structural parts in the motor vehicle field, in the field of road, rail, sea, aeronautical or aerospace transport or in mechanical construction or in the building industry or in parks and recreation or for reinforcements for shields or panels for protection against the impact of projectiles.

BACKGROUND OF THE INVENTION

EP 0 261 020 describes the use of reactive semicrystalline prepolymers based on PA 6, 11 and 12 for the production of a thermoplastic composite by a pultrusion process. The prepolymers of aliphatic structure as described exhibit low Tg values and insufficient mechanical performance qualities under hot conditions.

EP 550 314 describes, among its examples, (nonreactive) copolyamide compositions in a search for melting temperatures (Tm) of greater than 250° C. and limited Tg values, with the majority of the examples cited having an excessively low Tg (<80° C.) or an excessively high Tm (>300° C.).

EP 1 988 113 describes a molding composition based on a 10 T/6 T copolyamide with:
  40 to 95 mol % of 10 T
  5 to 40 mol % of 6 T.

Polyamides with a high melting temperature of greater than 270° C. are targeted in particular. The examples mentioned and FIG. 1 in this document teach that the melting temperature of these compositions is at least approximately 280° C.

WO 2011/003973 describes compositions comprising from 50 to 95 mol % of a unit based on a linear aliphatic diamine comprising from 9 to 12 carbon atoms and on terephthalic acid and from 5% to 50% of unit combining terephthalic acid with a mixture of 2,2,4- and 2,4,4-trimethylhexanediamine.

US 2011/306718 describes a process for the pultrusion of reactive aliphatic polyamides having low Tg values in combination with chain extenders of polymeric structure bearing several (and many more than 2) anhydride or epoxide functions.

WO 2013/060976 describes a composite material process based on a reactive precursor composition comprising a reactive prepolymer with identical reactive functions and a non-polymeric chain extender bearing functions that react with the functions of said prepolymer via polyaddition.

WO 2014/064375 describes a reactive composition of semicrystalline polyamide prepolymer but in all the examples with a reactive precursor composition, the extending is carried out by an extender of different nature relative to a polyamide prepolymer.

SUMMARY OF THE INVENTION

The first drawback overcome by the present invention relative to the prior art relates to an improved and more homogeneous impregnation of the fibers of the fibrous reinforcement by the use of a specific precursor composition for the semicrystalline polymer matrix of the targeted composite material and with characteristics of reactive polyamide prepolymers used that allow a low enough viscosity for a good impregnation and adhesion to the fibers with mechanical performance levels that result therefrom which are more uniform and at the same time good reactivity and reaction and crystallization kinetics which are suitable for the process used.

Moreover, the present invention enables a good compromise between the mechanical performance levels and the processability (ease of transformation) at lower temperature. Specifically, the solution of the present invention targets semicrystalline polyamide (PA) compositions that enable easier processing at lower temperatures with a saving regarding the energy balance of the implementation process. In particular, this is enabled by the rapid crystallizability of said semicrystalline polyamide polymer by the specific choice of its composition, and this being while maintaining the mechanical performance levels of said final materials at a high level. More particularly, the reactive precursor compositions used by the process according to the present invention enable a better control of the reaction kinetics, while having a rapid rate of crystallization of the polymer formed and a crystallization temperature and/or rate suitable for the process used.

The choice of a semicrystalline polyamide polymer, as matrix of the composite material of the invention, has the advantage, compared with amorphous polyamides, of significantly improved mechanical performance levels, especially at elevated temperature, such as creep resistance or fatigue resistance. In addition, having a melting point above 200° C. has the advantage in the motor vehicle industry of being compatible with treatments by cataphoresis, which a structure of amorphous PA type does not permit. As for the amorphous materials, a Tg of greater than or equal to 80° C. is sought so as to ensure good mechanical properties for the composite over the entire working temperature range, for example up to 90° C. for the wind power industry, up to 100° C. for the motor vehicle industry and up to 120° C. for the aeronautics industry. Conversely, an excessively high melting point, in particular of greater than 280° C., is detrimental as it requires processing of the composite at higher temperatures with constraints in terms of molding equipment to be used (and associated heating system) and excessive consumption of energy with, in addition, risks of thermal degradation due to heating at temperatures higher than the melting temperature of said polyamide. Such a thermal degradation has the effect of degrading the properties of the final thermoplastic matrix and therefore of the composite material and final composite part. The crystallinity of said polymer should be as high as possible but with a melting temperature Tm that is not too high (Tm<80° C. and more particularly ≤270° C.) in order to optimize the mechanical performance levels and the crystallization rate and/or crystallization temperature to be as high as possible. Thus, a selective choice of the composition of said semicrystalline polyamide allows easier processing for a processing process, preferably under the conditions of processing by RTM (resin transfer molding), in particular c-RTM (compression RTM) or by the RIM, in particular S-RIM, technique, more preferentially by c-RTM. Consequently, the subject of the present invention is the processing of novel specific compositions of thermoplastic composite material, in particular based on semicrystalline polyamide, having a good compromise between high mechanical performance levels (mechanical strength), in particular at high temperature, and easy processing. This means that the present invention targets compositions that are easy to process with transformation and processing temperatures that are lower than those for other compositions of the prior art, with a more favorable overall processing energy balance and a higher productivity. More particularly, the solution of the invention with its specific reactive compositions based on semicrystalline reactive polyamide prepolymers allows both controlled reaction kinetics during the impregnation and fast crystallization kinetics. More particularly, in specific cases depending on the composition and/or under specific conditions of processing by RTM, such as c-RTM, molding, or RIM, such as S-RIM, molding, in particular RTM molding, it allows a production of molded composite parts with polymerization kinetics that are slower than with reactive monomeric extenders by polyaddition. This facilitates the impregnation of the fibrous reinforcements, while at the same time allowing a shorter molding cycle, that is to say less than 10 min and preferably less than 5 min, by virtue of rapid crystallization kinetics. A particular feature of the invention is that the reactive system is chemically homogeneous, since it does not comprise reactive extender of chemical nature different than that of the prepolymer, said extender being capable of disorganizing the final polymer and thus impairing the crystallization thereof. More particularly, the polyamide polymer matrix, while having a high Tg and a limited Tm as already defined, should also have a high crystallization rate. This performance may be characterized by the difference between the melting temperature Tm and the crystallization temperature Tc, Tm−Tc, which does not exceed 60° C., preferably does not exceed 50° C. and more particularly does not exceed 40° C. The mechanical performance levels or mechanical strength at high temperature of the composite may be evaluated by the variation of the mechanical modulus between ambient temperature (23° C.) and 100° C., with maintenance of at least 75% of the mechanical performance levels, in terms of tensile strength, relative to those at ambient temperature (23° C.).

In particular, the reactive precursor compositions based on a reactive prepolymer having identical reactive functions and a nonpolymeric chain extender bearing functions coreactive with those of said prepolymer polymerizing via polyaddition, according to the prior art, have the drawback of resulting in compositions with very rapid reaction kinetics that pose a problem during the impregnation step since, if the polymerization is too rapid, the impregnation is more difficult. The solution of the present invention based on the use of reactive precursor compositions based on reactive prepolymers (i.e. without nonpolymeric extender) as described below, polymerizing via polycondensation, enables slower and controlled kinetics during the impregnation step, thus enabling an easier impregnation, in particular under the conditions for processing said composite material by RTM, in particular c-RTM (compression RTM) or by the RIM, in particular S-RIM, technique, more preferentially by c-RTM.

In addition, the use of prepolymer makes it possible to carry out the polymerization step after an efficient impregnation due to the low viscosity of said prepolymer-based reactive precursor composition before the significant polymerization before this separate polymerization step.

Therefore, the object of the invention is to develop a composite material process with a precursor composition based on specific polyamide prepolymer that meets all these requirements.

DETAILED DESCRIPTION OF THE INVENTION

The first subject of the invention relates to a process for producing by molding, in a closed mold, a composite material comprising a fibrous reinforcement and a semicrystalline polyamide thermoplastic matrix, said process comprising the preparation, in the molten state, of said reactive precursor composition, based on polyamide prepolymer of specific composition, the impregnation of said fibrous reinforcement by injection in a closed mold containing said fibrous reinforcement of said reactive composition in the molten state and the bulk melt polymerization of said composition, with the possibility of post-polymerization if the polymerization is not complete and, finally, cooling and demolding of said composite-material part thus produced, said process preferably being a process with molding according to the RTM (resin transfer molding) technique. The term "resin" in RTM refers herein to said reactive precursor composition.

The second subject of the invention relates to said reactive precursor composition as used in said process.

The invention also covers the composite-material part obtained by means of said process.

The first subject of the invention therefore relates to a process for producing a part made of a thermoplastic composite material by molding in a closed mold, said material comprising reinforcing fibers and a polyamide thermoplastic matrix impregnating said fibers, with said matrix being a semicrystalline polyamide with a glass transition temperature Tg of at least 80° C., preferably of at least 90° C. and more preferentially of at least 100° C. and with a melting temperature Tm being less than or equal to 280° C. and greater than 200° C., preferably greater than 220° C., prepared in situ by bulk melt polycondensation polymerization of a reactive precursor composition comprising according to A at least one first polyamide prepolymer A1 bearing two identical functions X (X and X) or Y (Y and Y) and at least one second polyamide prepolymer A2 bearing two identical functions X (X and X) or Y (Y and Y), different than those of A1 and coreactive with respect to those of A1, or of a precursor composition comprising according to B at least one prepolymer bearing (on the same chain) two different functions X and Y which are coreactive with one another, or of a precursor composition according to a mixture of (A+B), with said functions X and Y being respectively carboxy (X) and amine (Y) and inversely (Y and X) and with said process comprising the following successive steps:

i) preparation of the reactive mixture A: (A1+A2) or of the reactive mixture (A+B): (A1+A2+8) by melt blending the components or by melting said prepolymer B if it is the only component of said reactive precursor composition, at a temperature greater than that of the melting temperature Tm of the mixture A or of the mixture (A+B) or of the Tm of said prepolymer B if it is the only component of said precursor composition, ii) injection in a closed mold comprising said fibers of said reactive precursor composition in the molten state as obtained in step i) and impregnation of said fibers by said reactive precursor composition in the molten state, which is, as appropriate, the mixture A or (A+B) or said prepolymer B, preferably with a viscosity<100 Pa·s, more preferentially <50 Pa·s, more preferably <10 Pa·s, iii) in situ bulk melt polycondensation polymerization in said closed mold and with a controlled polymerization time and a controlled polymerization temperature such that the polymerization temperature is higher than the crystallization temperature Tc of said thermoplastic matrix polyamide, iv) optionally, cooling of said composite-material part, v) demolding of said part, and with said final polyamide of said matrix and said prepolymers A1, A2 or B having the same amide unit composition and said amide units being derived from:

a) a diacid component which is 95 to 100 mol %, preferably 100 mol % of terephthalic structure, with the presence of 0 to 5 mol % of isophthalic diacid, preferably a) being 100% the terephthalic diacid, b) a diamine component composed of:
   b1) from 55 to 85 mol %, preferably from 55 to 80 mol % of a $C_9$, $C_{10}$, $C_{11}$ or $C_{12}$ aliphatic linear diamine, and
   b2) from 15 to 45 mol %, preferably from 20 to 45 mol % of a diamine different than b1), selected from:
      b21) a mono-branched aliphatic diamine with methyl or ethyl substituent and having a difference in chain length relative to the associated diamine b1) of at least two carbons, said diamine b2) preferably being 2-methylpentamethylenediamine
      b22) m-xylylenediamine (mXD) or
      b23) a $C_4$ to $C_{18}$ linear aliphatic diamine when b1) is a $C_{10}$ to $C_{12}$ linear aliphatic diamine and with b23) being a $C_{10}$ to $C_{18}$ diamine when said diamine b1 is a $C_9$ diamine,
      b24) 1,3-bis(aminomethyl)cyclohexyl (1,3 BAC), 1,4-bis(aminomethyl)cyclohexyl (1,4 BAC) and a mixture thereof, in particular 1,3-bis(aminomethyl)cyclohexyl (1,3 BAC),
and
c) optionally, an amino acid or, as appropriate, the corresponding $C_6$ to $C_{12}$, preferably $C_6$, $C_{11}$ or $C_{12}$, and more preferentially $C_{11}$, lactam, with c) representing no more than 30 mol % relative to a) or relative to b), said process preferably being an RTM (resin transfer molding) process, in particular c-RTM process, or a RIM process, in particular s-RIM process, more preferentially being an RTM process, in particular c-RTM process.

According to one more particularly preferred option of said process, it is a process with an RTM (resin transfer molding), and more preferentially c-RTM, molding technique.

Said process may comprise an additional post-polymerization step. This is carried out in the mold or outside the mold, if there is a need to complete the polymerization in the case where the polymerization of step iii) is not complete, which remains a possible option. Preferably, this post-polymerization is carried out outside the mold. According to one preferred option, there is no post-polymerization.

The polymerization temperature is higher than the crystallization temperature Tc of the prepolymer polyamide having the highest Tc and preferably higher by at least Tc+5° C.

According to one particular option, the diamine b1) is 1,10-decamethylenediamine and the diamine b2) is chosen from MPMD or mXD with a) being terephthalic acid.

According to another particular option, the diamine b1) is 1,10-decamethylenediamine and the diamine b2) is chosen from 1,3-bis(aminomethyl)cyclohexyl (1,3 BAC), 1,4-bis(aminomethyl)cyclohexyl (1,4 BAC) and a mixture thereof, in particular 1,3-bis(aminomethyl)cyclohexyl (1,3 BAC) with a) being terephthalic acid.

Preferably, said polyamide comprises b1), b2) and c) and, in this case, the molar ratio, in %, of c/(b1+b2) which means that c/b ranges from 5 to 30% and preferably from 10 to 30%.

More preferentially, said polyamide comprises (in its unit structure) the component c) which is chosen from 11-aminoundecanoic acid or 12-aminolauric acid or lauryl lactam.

More preferably still, said polyamide of said thermoplastic matrix has, as components, (like said prepolymers A1, A2 and B have): a) terephthalic acid, b1) 1,10-decamethylenediamine, b2) 1,6-hexamethylenediamine or MPMD or mXD or 1,3 BAC or 1,4 BAC and c) 11-aminoundecanoic acid or 12-aminolauric acid or lauryl lactam.

More particularly, said polyamide (matrix like prepolymers A1, A2 and B) has, as components, a) terephthalic acid, b1) 1,10-decamethylenediamine, b2) 1,6-hexamethylenediamine or MPMD or mXD or 1,3 BAC or 1,4 BAC and c) 11-aminoundecanoic acid.

More particularly still, said polyamide (matrix like prepolymers A1, A2 and B) has, as components, a) terephthalic acid, b1) 1,10-decamethylenediamine, b2) 1,6-hexamethylenediamine and c) 11-aminoundecanoic acid.

According to another particularly preferred option, said polyamide has, as components: a) terephthalic acid, b1) 1,10-decamethylenediamine, b2) 1,6-hexamethylenediamine and c) 12-aminoundecanoic acid.

In the preferred case where said component c) is present, said reactive compositions of prepolymers (A1+A2), B or (A1+A2+B) according to the invention enable a lower melt viscosity relative to the same compositions without c), at comparable molecular weight. This allows a significant improvement in the impregnation of said fibrous reinforcement. Alternatively, for a constant melt viscosity, the presence of c) makes it possible to have higher prepolymer molecular weights.

More particularly, the molar ratio of b1/(b1+b2) ranges from 55 to 75% and the molar ratio of b2/(b1+b2) ranges from 25 to 45%.

According to one particular variant, said reactive precursor composition comprises at least one nanofiller of carbon origin chosen from: carbon black, graphenes, carbon nanofibrils and carbon nanotubes, said nanofiller being added in a form which is predispersed in the most fluid constituent.

The process of the invention relates in particular and preferably to a process with an RTM molding technique and it is more particularly a process with a c-RTM (compression RTM) molding technique.

According to one particular and preferred option, said precursor composition, as defined above, may comprise, in addition to said prepolymers, an additive which absorbs the radiation from a UV laser at a specific wavelength or from IR heating or from microwave heating or from induction heating for the purposes of reheating said composite material (composite part), before an additional conversion operation, in particular by heat stamping or by overmolding.

Regarding said fibers of said fibrous reinforcement, they are long fibers with an L/D>1000, preferably >2000 (L being the length and D the diameter of said fibers). Preferably, said fibers are selected from mineral fibers, preferably glass, carbon or basalt fibers, in particular glass or carbon fibers, or from synthetics, preferably aramid fibers or polyaryl ether ketone fibers. Said fibers may represent proportions of from 45 to 75% by volume of said composite material, preferably from 50 to 70%.

More particularly, the process of the invention relates to the production of a structural part based on said composite material. More particularly still, said part is a part in the field of road, rail, sea, aeronautical or aerospace transport or in mechanical construction or in the building industry or in parks and recreation or for producing a reinforcement for shields or panels for protection against the impact of projectiles. In particular, said structural part may be a motor vehicle part, optionally inserted into a metal structure such as the body in white of a vehicle, optionally subjected (with said composite part inserted) to a cycle of thermochemical treatment by cataphoresis. This means that said composite parts for this use must withstand the conditions of treatment by cataphoresis. In particular, a high Tm of said part enables such a treatment.

More particularly, the difference Tm−Tc between the melting temperature Tm and the crystallization temperature Tc of said matrix polymer (polyamide) does not exceed 60° C., preferably does not exceed 50° C. and more particularly does not exceed 40° C.

According to a specific option, the enthalpy of crystallization of said matrix polymer, measured by differential scanning calorimetry (DSC) according to the standard ISO 11357-3:2013, is greater than 40 J/g, preferably greater than 45 J/g.

Said prepolymers A1, A2 and B, as defined above, have a number-average molecular weight Mn ranging from 500 to 10 000, preferably from 750 to 6000, more preferentially from 750 to 3000. All the masses Mn are determined by calculation on the basis of the content of the end functions, determined by potentiometric titration in solution, and the functionality of said prepolymers. Said polyamide prepolymers may be prepared according to the methods as described in the examples of reactive prepolymers in WO 2014/064375.

Regarding the various parameters defined according to the invention, they are determined as explained in succession below.

The melt viscosity of the prepolymer or of the precursor composition is measured according to the reference manual of the constructor of the measurement device used, which is a Physica MCR301 rheometer, under nitrogen flushing at the given temperature under a shear of 1 s$^{-1}$, between two parallel plates with a diameter of 50 mm.

The Mn of the thermoplastic polymer or prepolymer is determined from the titration (assaying) of the end functions according to a potentiometric method (direct assaying for $NH_2$ or COOH) and from the theoretical functionality, which is 2 (as end functions) for linear polymers and prepolymers prepared from bifunctional monomers alone.

Measurement of the intrinsic or inherent viscosity is performed in m-cresol. The method is well known to those skilled in the art. The standard ISO 307:2007 is followed, but changing the solvent (use of m-cresol instead of sulfuric acid), the temperature (20° C.) and the concentration (0.5% by weight).

The glass transition temperature Tg of the thermoplastic polymers used is measured using a differential scanning calorimeter (DSC), after a second heating pass, according to the standard ISO 11357-2:2013. The heating and cooling rate is 20° C./min.

The melting temperature Tm and the crystallization temperature Tc are measured by DSC, after a first heating, according to the standard ISO 11357-3:2013. The heating and cooling rate is 20° C./min.

The enthalpy of crystallization of said matrix polymer is measured by differential scanning calorimetry (DSC) according to the standard ISO 11357-3:2013.

The second subject of the invention covers said reactive precursor composition based on polyamide prepolymer, for the implementation of the process as described above according to the present invention, which composition is as already defined above. It corresponds to the mixture A: (A1+A2), to the mixture (A+B) or to the prepolymer B as already defined above. Preferably, said reactive precursor composition comprises at least one nanofiller of carbon origin chosen from: carbon black, graphenes, carbon nanofibrils and carbon nanotubes, said nanofiller being added in a form which is predispersed in the most fluid constituent.

Another subject of the invention relates to a composite-material part obtained by means of a process as defined above according to the invention or by using a precursor composition as defined above according to the invention.

More particularly, the invention covers a composite-material part obtained according to the process as defined above according to the invention, with said part being a structural part in the motor vehicle field, road, rail or sea transport field, aeronautical field or aerospace field or in mechanical construction or in the building industry or in parks and recreation or for reinforcements for shields or panels for protection against the impact of projectiles.

DESCRIPTION OF THE FIGURE

FIG. 1 shows a photo taken with a scanning electron microscope of woven glass fibers (woven taffeta fabric, at 600 g/m$^2$, based on Advantex® glass fiber from 3B, SE4535 size) impregnated with the oligomers 1 and 2 according to the process of the invention.

EXAMPLES

Methods for Determining the Characteristics Mentioned
  The titration (quantitative determination) of the end functions is carried out according to a potentiometric method (direct quantitative determination for $NH_2$ or COOH).
  The glass transition temperature Tg is measured using a differential scanning calorimeter (DSC), after a second heating pass, according to the standard ISO 11357-2:2013. The heating and cooling rate is 20° C./min.

The melting temperature Tm and the crystallization temperature Tc are measured by DSC, according to the standard ISO 11357-3:2013. The heating and cooling rate is 20° C./min.

The enthalpy of fusion of said matrix polymer is measured by differential scanning calorimetry (DSC), after a second heating pass, according to the standard ISO 11357-3:2013.

The morphology images are obtained by scanning electron microscopy, after cutting the sample in the transverse direction of the fibers and preparing the sample by ion polishing.

Preparation of Functionalized Oligomers:

The following procedure is an example of a preparation process, and of course is not limiting.

5 kg of the following starting materials are introduced into a 14-liter autoclave reactor:
- 500 g of water,
- the diamine or diamines,
- the amino acid (optionally),
- the diacid or diacids,
- 35 g of sodium hypophosphite in solution,
- 0.1 g of a Wacker AK1000 antifoaming agent (Wacker Silicones).

The closed reactor is purged of its residual oxygen and then heated to a temperature of 230° C. of the material. After stirring for 30 minutes under these conditions, the pressurized vapor which has formed in the reactor is gradually reduced in pressure over 60 minutes, while gradually increasing the internal temperature so that it becomes established at Tm+10° C. at atmospheric pressure.

The oligomer (prepolymer) is subsequently emptied out via the bottom valve, then cooled in a water trough and then ground.

The nature and molar ratio of the unit and molecular structure of the polyamide exemplified, and also the main characteristics thereof, are given in table 1 below.

TABLE 1

Characteristics of the functionalized oligomers synthesized

| | Molecular structure and molar composition | Function | Tm ° C. | Tg: ° C. | Tc ° C. | ΔH J/g | Acid number eq/T | Amine number eq/T |
|---|---|---|---|---|---|---|---|---|
| Oligomer 1 | 11/6T/10T 16/24/60 | $NH_2$ | 269.2 | 81.7 | 234.8 | 69.8 | 0 | 620 |
| Oligomer 2 | 11/6T/10T 9.1/27.3/63.6 | COOH | 263.3 | 97 | 228 | 56 | 711 | 0 |

Example 1

A c-RTM test is carried out using the two oligomers 1 and 2, mixed using a static mixer of Sulzer type in a 50/50 weight ratio in a mold heated to 280° C. containing 4 plies of woven glass fibers. The two polymers are melted beforehand in independent pots heated to 280° C. A slight vacuum is applied in order to extract any air from the pots before the melting and the injection. Once the vacuum has been produced in the mold, the suctioning allowing the vacuum to be produced is turned off before injection and a mold inlet valve makes it possible to keep the mold under vacuum even when the suctioning is turned off.

After injection and compression, the mold is cooled in the open air and the part obtained is removed from the mold at 180° C.

The state of impregnation of the fibers is excellent, and no cracks are detected, as shown by FIG. 1.

The invention claimed is:

1. A process for producing a part made of a thermoplastic composite material by molding in a closed mold, said material comprising reinforcing fibers and a polyamide thermoplastic matrix impregnating said fibers, wherein said matrix is a semicrystalline polyamide with a glass transition temperature Tg of at least 80° C., and with a melting temperature Tm of less than or equal to 280° C. and greater than 200° C., prepared in situ by bulk melt polycondensation polymerization of a reactive precursor composition comprising according to A at least one first polyamide prepolymer A1 bearing two identical functions X (X and X) or Y (Y and Y) and at least one second polyamide prepolymer A2 bearing two identical functions X' (X' and X') or Y' (Y' and Y'), different than those of A1 and coreactive with respect to those of A1, or of a precursor composition comprising according to B at least one prepolymer bearing on the same chain two different functions X and Y which are coreactive with one another, or of a precursor composition according to a mixture of (A+B), with said functions X and Y being respectively carboxy (X) and amine (Y) and inversely (Y and X) and in that said process comprises the following successive steps:

i) preparation of the reactive mixture A: (A1+A2) or of the reactive mixture (A+B): (A1+A2+B) by melt blending the components or melting said prepolymer B if it is the only component of said reactive precursor composition, at a temperature greater than that of the melting temperature Tm of the mixture A or of the mixture (A+B) or of the Tm of said prepolymer B if it is the only component of said precursor composition, ii) injection in a closed mold comprising said fibers of said reactive precursor composition in the molten state as obtained in step i) and impregnation of said fibers by said reactive precursor composition in the molten state, which is, as appropriate, A or (A+B) or said prepolymer B, iii) in situ bulk melt polycondensation polymerization in said closed mold and with a controlled polymerization time and a controlled polymerization temperature such that the polymerization temperature is higher than the crystallization temperature Tc of said thermoplastic matrix polyamide, iv) optionally, cooling of said composite-material part, v) demolding of said part, and with said polyamide of said matrix and said prepolymers A1, A2 or B having the same amide unit composition and said amide units being derived from:

a) a diacid component which is 95 to 100 mol%, of terephthalic structure, with the presence of 0 to 5 mol% of isophthalic diacid, b) a diamine component composed of:
  b1) from 55 to 85 mol% of a $C_9$, $C_{10}$, $C_{11}$ or $C_{12}$ aliphatic linear diamine, and
  b2) from 15 to 45 mol% of a diamine different than b1), selected from:
    b21) a mono-branched aliphatic diamine with methyl or ethyl substituent and having a difference in chain length relative to the associated diamine b1) of at least two carbons,
    b22) m-xylylenediamine (mXD) or
    b23) a $C_4$ to $C_{18}$ linear aliphatic diamine when b1) is a $C_{10}$ to $C_{12}$ linear aliphatic diamine and with b23) being a $C_{10}$ to $C_{18}$ diamine when said diamine b1 is a $C_9$ diamine,
    b24) 1,3-bis(aminomethyl)cyclohexyl (1,3 BAC), 1,4-bis(aminomethyl)cyclohexyl (1,4 BAC) and a mixture thereof,
  and
c) optionally, an amino acid or, as appropriate, the corresponding $C_6$ to $C_{12}$ lactam with c) representing no more than 30 mol% relative to a) or relative to b).

2. The process as claimed in claim 1, wherein it is an RTM (resin transfer molding) process.

3. The process as claimed in claim 1, wherein it comprises an additional step of post-polymerization.

4. The process as claimed in claim 1, wherein said polyamide comprises b1), b2) and c) and that the molar ratio, in %, of c/(b1+b2) ranges from 5 to 30%.

5. The process as claimed in claim 1, wherein said polyamide comprises c) chosen from 11-aminoundecanoic acid or 12-aminolauric acid or lauryl lactam.

6. The process as claimed in one of claim 1, wherein said polyamide has, as components, a) terephthalic acid, b1) 1,10-decamethylenediamine, b2) 1,6-hexamethylenediamine or 2-methylpentamethylenediamine (MPMD) or m-xylylenediamine (mXD) or 1,3 bis(aminomethyl)cyclohexyl (BAC) or 1,4 BAC and c) 11-aminoundecanoic acid or 12-aminolauric acid or lauryl lactam.

7. The process as claimed in claim 1, wherein said polyamide has, as components, a) terephthalic acid, b1) 1,10-decamethylenediamine, b2) 1,6-hexamethylenediamine and c) 11-aminoundecanoic acid.

8. The process as claimed in claim 1, wherein said polyamide has, as components, a) terephthalic acid, b1) 1,10-decamethylenediamine, b2) 1,6-hexamethylenediamine and c) 12-aminoundecanoic acid.

9. The process as claimed in claim 1, wherein b1) is 1,10-decamethylenediamine and b2) is chosen from 2-methylpentamethylenediamine (MPMD) or mXD or 1,3 BAC or 1,4 BAC and a) is terephthalic acid.

10. The process as claimed in claim 1, wherein the molar ratio of b1/(b1+b2) ranges from 55 to 75% and that the molar ratio of b2/(b1+b2) ranges from 25 to 45%.

11. The process as claimed in claim 1, wherein said reactive precursor composition comprises at least one nanofiller of carbon origin chosen from: carbon black, graphenes, carbon nanofibrils and carbon nanotubes, said nanofiller being added in a form which is predispersed in the most fluid constituent.

12. The process as claimed in claim 1, wherein it is a c-RTM (compression RTM) process.

13. The process as claimed in one of claims 1 to 12, characterized in that said precursor composition comprises, in addition to said prepolymers, an additive which absorbs the radiation from a UV laser at a specific wavelength or from IR heating or from microwave heating or from induction heating for the purposes of reheating said composite, before an additional conversion operation.

14. The process as claimed in claim 1, wherein said fibers are long fibers with an L/D >1000.

15. The process as claimed in claim 1, wherein said fibers are selected from mineral fibers, or from synthetics.

16. The process as claimed in claim 1, wherein said part is a structural part.

17. The process as claimed in claim 16, wherein said structural part is a part in a structure selected from the group consisting of a road, rail, sea, aeronautical or aerospace transport structure, a mechanical construction structure, a building, a parks and recreation structure, a reinforced shield, and a structure for protection against the impact of projectiles.

18. The process as claimed in claim 16, wherein said structural part is a motor vehicle part, optionally inserted into a metal structure such as the body in white of a vehicle.

* * * * *